US011423413B2

(12) United States Patent
Pandey et al.

(10) Patent No.: US 11,423,413 B2
(45) Date of Patent: Aug. 23, 2022

(54) INTELLIGENT COMMUNICATION CHANNEL DETERMINATION (71) Applicant: PayPal, Inc., San Jose, CA (US)

(72) Inventors: Shivam Pandey, Bangalore (IN); Ajay Bose Anchalassery Chandrabose, Bangalore (IN); Satheeskumar S, Bangalore (IN)

(73) Assignee: PAYPAL, INC., San Jsoe, CA (US)

( * ) Notice: Subject to any disclaimer, the term of this patent is extended or adjusted under 35 U.S.C. 154(b) by 115 days.

(21) Appl. No.: 16/409,748

(22) Filed: May 10, 2019

(65) Prior Publication Data

US 2020/0356999 A1  Nov. 12, 2020

(51) Int. Cl.
*G06Q 30/00* (2012.01)
*G06Q 10/06* (2012.01)
*H04M 3/493* (2006.01)
*H04M 3/51* (2006.01)

(52) U.S. Cl.
CPC ..... *G06Q 30/016* (2013.01); *G06Q 10/06311* (2013.01); *H04M 3/493* (2013.01); *H04M 3/51* (2013.01); *H04M 3/5191* (2013.01)

(58) Field of Classification Search
CPC ........... G06Q 30/016; G06Q 10/06311; H04M 3/493
See application file for complete search history.

(56) References Cited

U.S. PATENT DOCUMENTS

| 6,347,139 | B1 | 2/2002 | Fisher et al. |
| 9,137,372 | B2 | 9/2015 | Conway et al. |
| 10,554,817 | B1* | 2/2020 | Sullivan ............... H04L 41/5054 |
| 2011/0047116 | A1* | 2/2011 | Balasaygun ........... G06Q 30/02 706/47 |
| 2011/0137701 | A1 | 6/2011 | Tsipenyuk et al. |
| 2013/0080362 | A1* | 3/2013 | Chang ................. G06Q 30/0202 706/21 |
| 2014/0207622 | A1* | 7/2014 | Vijayaraghavan ........................... G06Q 30/0201 705/26.62 |
| 2015/0206092 | A1 | 7/2015 | Erhart et al. |

(Continued)

FOREIGN PATENT DOCUMENTS

WO   WO-2020081494 A1 *  4/2020   ....... G06F 16/90335

*Primary Examiner* — Rutao Wu
*Assistant Examiner* — Tyrone E Singletary
(74) *Attorney, Agent, or Firm* — Haynes and Boone, LLP (57) ABSTRACT In response to detecting that a user of a service provider requires assistance, a computer system determines a predicted user intent associated with the user based on monitoring activity associated with the user, and further determines that a first communication channel corresponds to the determined predicted user intent and causes a communication to be initiated with the user utilizing the first communication channel. The computer system determines a user-initiated intent based on analyzing input received from the user, and based on the user-initiated intent, determines if the user-initiated intent corresponds to the predicted user intent. In response to determining that the user-initiated intent does not correspond to the predicted user intent, the computer system determines that a second communication channel corresponds to the user-initiated intent and causes the communication with the user to be switched to the second communication channel.

20 Claims, 4 Drawing Sheets (56) References Cited

U.S. PATENT DOCUMENTS

| | | | | |
|---|---|---|---|---|
| 2015/0235240 A1* | 8/2015 | Chang | G06Q 30/0202 | 705/7.31 |
| 2015/0254675 A1* | 9/2015 | Kannan | G06Q 30/02 | 705/304 |
| 2015/0339683 A1* | 11/2015 | Kannan | G06Q 30/0202 | 705/7.31 |
| 2015/0358460 A1* | 12/2015 | Monegan | G06Q 30/016 | 379/88.01 |
| 2016/0042419 A1* | 2/2016 | Singh | G06Q 30/0631 | 705/26.41 |
| 2016/0078456 A1* | 3/2016 | Chakraborty | G06Q 30/0204 | 705/7.31 |
| 2016/0171424 A1* | 6/2016 | Kannan | G06Q 30/0202 | 705/7.17 |
| 2016/0371703 A1* | 12/2016 | Monegan | H04L 67/306 | |
| 2017/0064083 A1* | 3/2017 | Gilbert | H04M 3/5141 | |
| 2017/0154495 A1* | 6/2017 | Sri | G06Q 30/0201 | |
| 2017/0278010 A1* | 9/2017 | Edakunni | G06N 5/02 | |
| 2018/0097765 A1* | 4/2018 | Bostick | H04L 51/34 | |
| 2019/0089699 A1* | 3/2019 | Krishnamurthy | G06F 21/34 | |
| 2019/0132451 A1* | 5/2019 | Kannan | H04M 3/5235 | |
| 2019/0146647 A1* | 5/2019 | Ramchandran | G06Q 30/016 | 715/758 |
| 2019/0251959 A1* | 8/2019 | Engles | H04M 3/5166 | |
| 2019/0340658 A1* | 11/2019 | Udupa | G06Q 30/016 | |
| 2019/0379615 A1* | 12/2019 | Karp | H04L 51/02 | |
| 2020/0193447 A1* | 6/2020 | Jaiswal | H04M 3/5191 | |
| 2020/0228452 A1* | 7/2020 | Boss | H04L 41/0896 | |

\* cited by examiner

INTELLIGENT COMMUNICATION CHANNEL DETERMINATION

TECHNICAL FIELD

The present disclosure relates to customer service, and more particularly to a system and method for utilizing intelligence to effectively determine the appropriate communication channel to communicate with customers and users.

BACKGROUND

Providing quality customer service is tantamount to running a successful company. However, providing quality and effective customer service is not only limited to the interactions between a customer service agent and a customer, but also includes the manner in which service is provided as well as the time it takes to provide the service. In many cases, corporations consider providing human to human customer service to be the primary way of achieving quality service, however, providing human to human customer service may be costly to provide. Therefore, there is a need for a system that can dynamically determine the appropriate channel of customer service to provide a customer in order to ensure that cost-effective and quality service is provided.

DETAILED DESCRIPTION

Embodiments of the present disclosure provide a system, method, and program product. In the example embodiment, in response to detecting that a user of a service provider requires assistance, a computer system determines a predicted user intent associated with the user based on monitoring activity associated with the user. The computer system determines that a first communication channel corresponds to the determined predicted user intent. The computer system causes a communication to be initiated with the user utilizing the first communication channel. The computer system determines a user-initiated intent based on analyzing input received from the user. In response to determining the user-initiated intent, the computer system determines if the user-initiated intent corresponds to the predicted user intent. In response to determining that the user-initiated intent does not correspond to the predicted user intent, the computer system determines that a second communication channel corresponds to the user-initiated intent. In response to determining that the second communication channel corresponds to the user-initiated intent, the computer system causes the communication with the user to be switched to the second communication channel.

In the example embodiment, the present disclosure describes a solution that describes a solution that identifies that a user requires assistance, such as with an application, product, or service. Furthermore, the solution identifies and transmits user information which may include one or more actions taken by the user and user identification information (among other things). In addition, the solution may determine a predicted intent, and based on the predicted intent may determine an appropriate channel(s) to initiate engagement with the user. Furthermore, the solution may determine a user-initiated intent based on received user input. The present solution may then determine if there is a convergence between the user-initiated intent and the predicted intent, and if there is not a convergence, the present solution may determine an appropriate communication channel based on the user-initiated intent and switch the communication channel to the newly determined communication channel. Furthermore, determining the appropriate communication channel may be based on the intent, an engagement score associated with the customer, and channel availability.

Embodiments of the present disclosure will now be described in detail with reference to the accompanying Figures.

Figure 1:
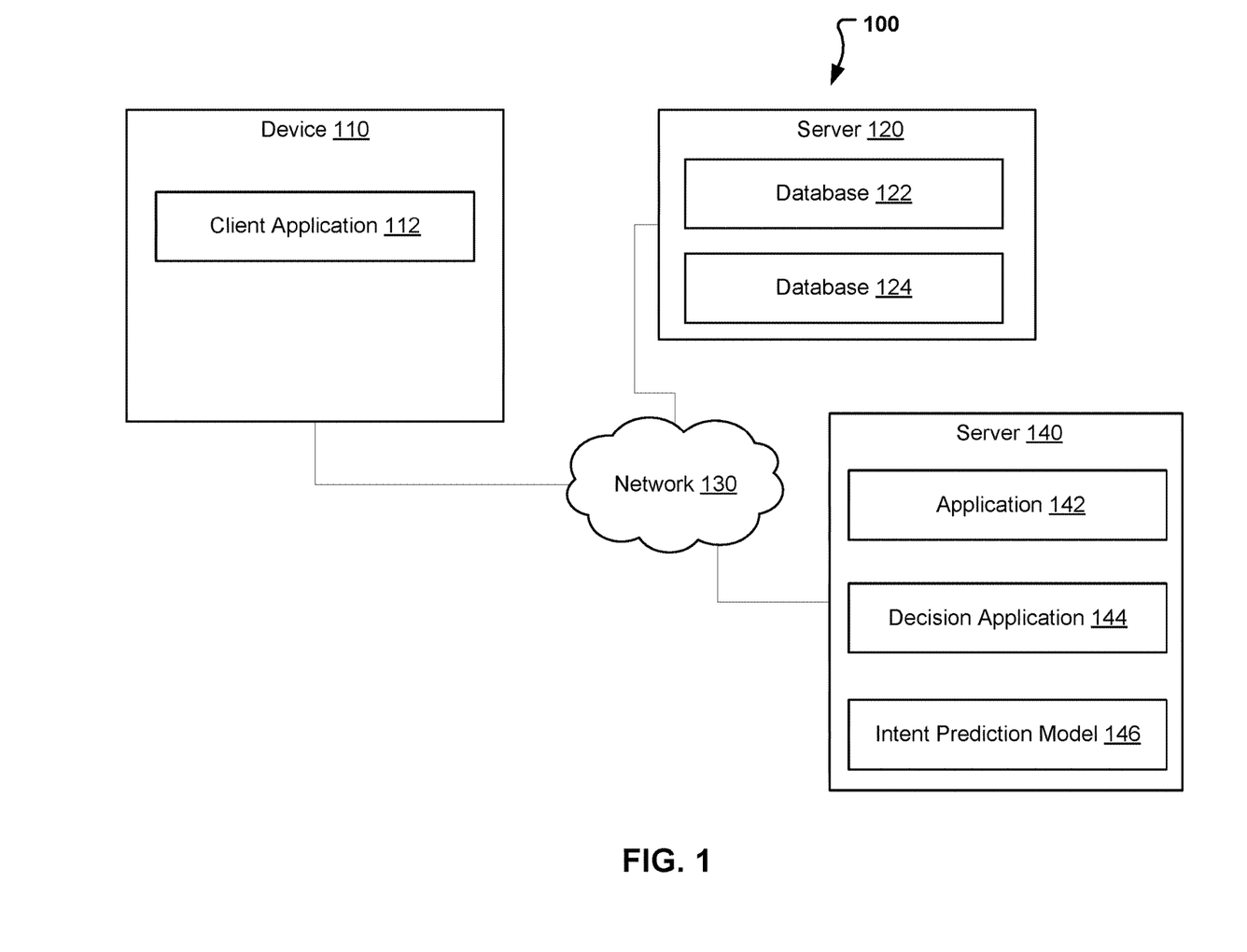
FIG. 1 illustrates an intelligent service system, in accordance with an embodiment.

FIG. 1 illustrates intelligent service system 100, in accordance with an embodiment. In the example embodiment, intelligent service system 100 includes device 110, server 120, and server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between device 110 and server 140.

In the example embodiment, server 120 includes database 122 and database 124. In the example embodiment, server 120 may be a desktop computer, a laptop computer, a tablet computer, a mobile device, a handheld device, a thin client, or any other electronic device or computing system capable of receiving and sending data to and from other computing devices, such as device 110, via network 130. Although not shown, optionally, server 120 can comprise a cluster of servers executing the same software to collectively process requests as distributed by a front-end server and a load balancer. In the example embodiment, server 120 is a computing device that is optimized for the support of databases that reside on server 120, such as database 122, and for the support of requests related to database 122. Server 120 is described in more detail with regard to the figures.

In the example embodiment, database 122 is a database that includes user information corresponding to one or more users of a service provider associated with server 140. In the example embodiment, the user information may include transactional information, preference information, user biographic information, user interests, user interactions with other users of the service provider, a user's prior questions regarding the utilization of a service provider application(s), and additional user interactions with a service provider application(s). For example, if the service provider is a payment service provider, database 122 may include transactional information, user payment information, user authentication information, invoices corresponding to each user, payment preference information, refunds, along with the information stated above. In the example embodiment, database 122 may include additional information, such as additional information corresponding to a history of one or more users with a service provider, and the lists provided above are not intended to be exhaustive. Database 122 is described in more detail with regard to the figures.

In the example embodiment, database 124 is a database that includes one or more user intents and one or more corresponding user channels. For example, database 124 may include a user intent of resetting a password with one or more appropriate communication channels (such as a direct phone call) listed in association with the user intent. Furthermore, database 124 may include a history of mappings applied to a specific user. For instance, referring to the example above, if the user was provided help with resetting a password via a first communication channel, and it was confirmed that the issue was resolved, the first communication channel may be mapped to the user intent of resetting a password. In other embodiments, where there are multiple channels associated with the intent of resetting a password, a weight value associated with the first communication channel may be adjusted upward each time that the channel is utilized to solve the issue successfully. This process may be utilized to build a mapping system within database 124 between user intent and one or more appropriate communication channels. In one or more embodiments, database 124 may include a custom mapping (based on previous actions/intents of a specific user) and may also include a general mapping (based on actions of a plurality of users). With regard to the general mapping, if the number of instances that a communication channel is verified as corresponding to a user intent (communication channel is utilized to successfully resolve the issue) exceeds a threshold number, a record associating the user intent to the communication channel may be maintained in the general mapping portion of database 124. Furthermore, if the number of instances that a communication channel is verified as not resolving an issue associated with a user intent exceeds a threshold number, a record associating the user intent to the communication channel may be updated to be disassociated with the user intent (within the general mapping or custom mapping portion of database 124. Database 124 is described in more detail with regard to the figures.

In the example embodiment, device 110 includes client application 112. In the example embodiment, device 110 may be a desktop computer, a laptop computer, a tablet computer, a mobile device, a handheld device, a thin client, or any other electronic device or computing system capable of receiving and sending data to and from other computing devices, such as server 120, via network 130. Device 110 is described in more detail with regard to the figures.

In the example embodiment, client application 112 is a client-side application, corresponding to the server-side application 142, that is capable of transmitting requests to application 142 and is further capable of providing received information to a user of device 110 via a user interface. In the example embodiment, client application 114 may be an e-commerce application, a financial application, a social media application, a merchant application, a service provider application, or another type of application. Client application 112 is described in more detail with regard to the figures.

In the example embodiment, server 140 includes application 142, decision application 144, and intent prediction model 146. In the example embodiment, server 140 may be a desktop computer, a laptop computer, a tablet computer, a mobile device, a handheld device, a thin client, or any other electronic device or computing system capable of receiving and sending data to and from other computing devices, such as device 110, via network 130. Furthermore, in the example embodiment, server 140 is a computing device that is optimized for the support of applications that reside on server 140, such as application 142. Although not shown, optionally, server 140 can comprise a cluster of servers executing the same software to collectively process requests as distributed by a front-end server and a load balancer. Server 140 is described in more detail with regard to the figures.

In the example embodiment, application 142 is a server-side application, corresponding to the client-side payment applications such as client application 112. Application 142 is capable of receiving information from client payment applications and further capable of responding to requests from corresponding client payment applications. In addition, in the example embodiment, application 142 is capable of utilizing client application 112 to monitor activity within client application 112 and also on device 110. Furthermore, application 142 may be an e-commerce application, a financial application, a social media application, a merchant application, a service provider application, or another type of application. Application 142 is described in more detail with regard to the figures.

In the example embodiment, intent prediction model 146 is a model that is capable of receiving input and providing a prediction output corresponding to a user intent. For example, intent prediction model 146 may receive input corresponding to a user's action within client application 112 (FAQ visited), along with additional information to determine a predicted user intent (such as password reset). Intent prediction model 146 is described in more detail with regard to the figures.

In the example embodiment, decision application 144 is an application that is capable of determining a user-initiated intent based on user information received from device 110. In the example embodiment, decision application 144 may be partially or fully integrated with application 142, and further, may utilize application 142, as described above, to monitor activity on device 110 and obtain user information. Furthermore, decision application 144 is capable of determining a predicted intent based on the monitored activity and determining one or more appropriate communication channels for the user based on the predicted intent. In addition, decision application 144 is capable of determining a user-initiated intent based on provided user input, and may compare the user-initiated intent to the predicted intent (determined via intent prediction model 146) in order to determine if they correspond to each other. In addition, based on determining that they do not correspond to each other, decision application 144 is capable of determining one or more appropriate communication channels that corresponds to the user-initiated intent. Further, in the example embodiment, decision application 144 is capable of changing the communication channel to a best communication channel of the one or more appropriate communication channels that correspond to the user-initiated intent. Decision application 144 is described in further detail with regard to the figures.

Figure 2:
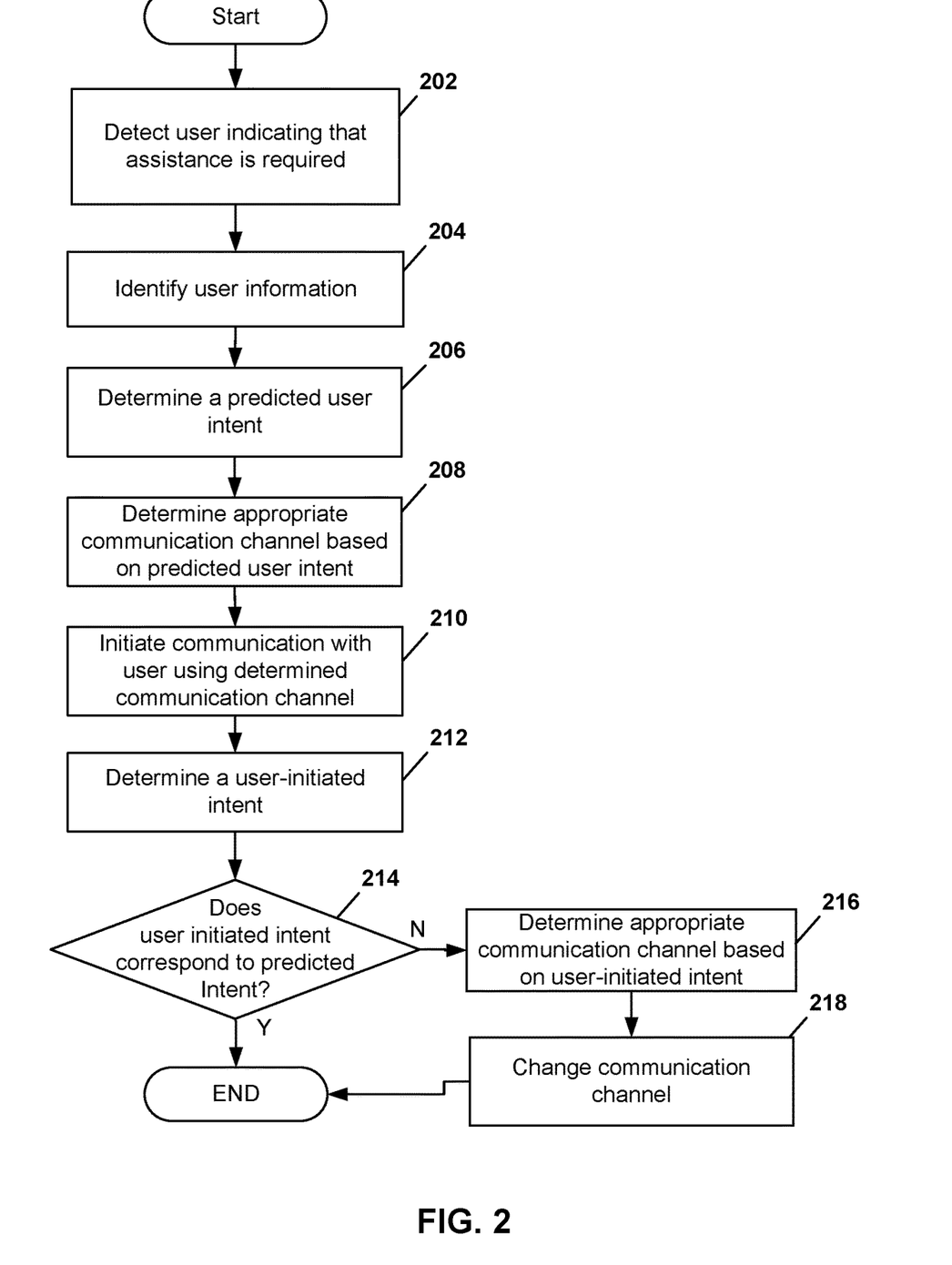
FIG. 2 is a flowchart illustrating the operations of the decision application of FIG. 1 in determining one or more appropriate communication channels for a user, and further initiating a communication with the user via the best determined communication channel, in accordance with an embodiment.

FIG. 2 is a flowchart illustrating the operations of decision application 144 in determining one or more appropriate communication channels for a user, and further initiating a communication with the user via the best determined communication channel, in accordance with an embodiment.

In the example embodiment, decision application 144 may utilize application 142 (via client application 112) to detect that a user, such as the user of device 110, is indicating that assistance is required (step 202). In the example embodiment, decision application 144 may be fully or partially integrated with application 142 and may utilize client application 112 to monitor actions within client application 112 (or on device 110). In other embodiments, decision application 144 may be a separate application from application 142 and may instead receive an indication that a user requires assistance from application 142. For example, a user of device 110 may access a FAQ question within client application 112 that corresponds to a monetary restriction that may be associated with certain users, which prevent the certain users from transferring large amounts of money using the application. In addition, client application 112 may monitor an amount of time that the user of device 110 spends on a specific FAQ question or multiple FAQ questions, and based on that, determine that the user requires assistance. In addition, client application 112 may also determine that the user of device 110 requires assistance based on monitoring other actions, such as if the user has entered incorrect login credentials a threshold amount of times, or if the user has spent greater than a threshold amount of time viewing a specific displayed content, or if the user attempts a transaction that fails. In other embodiments, decision application 144 may monitor or communicate with other devices that are monitoring one or more activities of the user of device 110. For example, decision application may communicate with an interactive voice response (IVR) server to identify that the user of device 110 has provided input that indicates assistance is required.

Based on detecting an indication that the user of device 110 requires assistance, decision application 144 may identify user information corresponding to the user of device 110. In the example embodiment, decision application 144 may utilize a device identifier or login credentials associated with the user of device 110 to identify a record in database 122 that corresponds to the user. Decision application 144 may then retrieve user information associated with the user of device 110 from database 122. In the example embodiment, as stated above, the user information may include user transactional information, user preference information, user biographic information, user interests, user interactions with other users of the service provider, a user's prior questions regarding the utilization of a service provider application(s), and additional user interactions with a service provider application(s), such as application 142 (and its clients).

In the example embodiment, decision application 144 may determine a predicted user intent of the user of device 110 by inputting the monitored user activity into intent prediction model 146 (step 206). Furthermore, in one or more embodiments, decision application 144 may additionally input one or more portion of the identified user information into intent prediction model 146 as well. Intent prediction model 146 may utilize a gradiant boosting techniques to determine a predicted user intent In the example embodiment, intent prediction model 146 may analyze the monitored user activity and may identify one or more than one potential user intents (with each being associated with a likelihood value). For example, if the user of device 110 views three different FAQs that pertain to three different matters, intent prediction model 146 may take into account how much time was spent viewing each FAQ, other user activity related to each FAQ (such as a web search done in a web browser that corresponds to the FAQ, or an unsuccessful login attempt that relates to a login FAQ), and may further take previous user activity into account. For example, if the user of device 110 has previously had multiple issues that relate to a first FAQ of the three viewed FAQ, intent prediction model 146 may determine that the previous activity increases the likelihood that the predicted user intent corresponds to the issue that relates to the first FAQ. Furthermore, other types of monitored activity, such as input into an IVR may also be taken into account.

Furthermore, in one or more embodiments, prior to being utilized, intent prediction model 146 may be trained using a plurality of data corresponding to user activity. For example, decision application 144 may input user activity and user information into intent prediction model 146 and adjust weight values and other characteristics of the model until the output (predicted user intent) matches a desired result.

In the example embodiment, decision application 144 may determine an appropriate communication channel based on the predicted user intent (step 208). In the example embodiment, decision application 144 may access database 124 to determine one or more communication channels that correspond to the predicted user intent. In one or more embodiments, examples of communication channels may be email, text message, IVR, a live phone call with a customer service agent, a chat session, or any other known communication method. For example, if the predicted user intent is resetting a password, decision application 144 may refer to database 124 and determine that a first communication channel (such as a chat), a second communication channel (such as an email correspondence option), and a third communication channel (such as a phone call option) are listed within database 124 in association with the predicted user intent of resetting a password. Furthermore, each of the communication channels may be associated with one or more specific weight values with regard to the predicted user intent. In the example embodiment, the weight values may correspond to the likelihood of success that the particular communication channel has for the particular issue (predicted user intent), the cost of utilizing the particular channel for the particular issue, the availability of the communication channel (based on hours of operation, current wait time information, etc.), and may also be based on user preferences. Referring to the example above, a total weight value (or multiple individual weight values) may be determined by decision application 144 in association with the first, second and third communication channels. Decision application 144, in the case of a total weight value for each of the channels, may determine which of the channels has the highest weight value.

In other embodiments, the cost of utilizing the particular channel may be utilized as a second level determination mechanism in determining an appropriate channel to initiate an engagement with the user of device 110. For example, decision application 144 may determine a total weight value that corresponds to the likelihood of success that the particular communication channel has for the particular issue (predicted user intent) and the availability of the communication channel for each of the first, second, and third channel referenced above. Decision application 144 may then utilize the cost of each of the communication channels to serve as factor in determining an appropriate channel amongst the (highest rated) channels that are within a threshold percentage (or threshold weight value) of each other. Referring to the example above, if the first and second channel are the two highest rated communication channels based on the associated total weight values, and the difference between the total weight value of the first channel and the second channel is less than a threshold percentage, decision application 144 may determine the associated cost of each communication channel and, identify the channel with the lowest associated cost as the most appropriate (or highest rated) communication channel for the particular issue (predicted user intent).

In further embodiments, an engagement score corresponding to the user of device 110 may also be taken into account. For example, decision application 144 may analyze user information retrieved from database 122, to determine an engagement score associated with the user of device 110. The engagement score may be based on a variety of factors including an amount that the user of device 110 utilizes the service provider associated with application 142, a transactional amount associated with the user of device 110 with regard to the service provider, a user satisfaction score with the service provided by the service provider, and a variety of other factors that corresponds to engagement between the user of device 110 and the service provider associated with application 142. In the further embodiments, decision application 144 may re-rate the hierarchy of the one or more communication channels associated with the predicted user intent of the user of device 110, based on the engagement score of the user of device 110. Referring to the example provided above, if the first and second communication channel are determined to be the highest rated channels for the particular predicted user intent based on the total weight value associated with each communication channel (with the associated cost not being included as a factor for the total weight values), decision application 144 may determine if the total weight values of the first and second channel are within a threshold percentage of each other, and if so may determine to rate the first communication channel higher than the second communication channel based on determining that a cost associated with the first channel is lower than a cost associated with the second channel. However, in these further embodiments, decision application 144 may take the engagement score of the user of device 110 into account, and based on the engagement score of the user of device 110 being above a threshold score, decision application 144 may rate or re-rate the hierarchy of communication channels so that the communication channel with the highest total weight value is rated as the best or most appropriate communication channel for the particular issue (or predicted user intent) regardless of the cost difference.

Furthermore, in one or more additional embodiments, decision application 144 may determine an availability score associated with the determined one or more communication channels that correspond to the predicted user intent. The availability score may be utilized in rating or re-rating the hierarchy of communication channels and/or determining an appropriate communication channel for the particular issue. For example, if a particular channel, such as a call with a call center, is unavailable due to the call center staff being unavailable at the time that the issue is identified, the channel may be re-rated to have a lower score (and in one or more instance be rated to have the lowest total weight value amongst the determined one or more communication channels). Furthermore, a wait time associated with each of the one or more communication channels may be utilized in determining the total weight score of each of the one or more communication channels (or re-rating the one or more communication channels).

Based on the determination of the most appropriate communication channel, decision application 144 may then initiate communication with the user of device 110 utilizing the determined appropriate communication channel (step 210). For example, if decision application 144 determines that a first communication channel (a chat) is the most appropriate communication channel for a predicted user intent (using the techniques described above), decision application 144 may then initiate a chat with the user of device 110. Furthermore, within the communication channel, decision application 144 may provide information corresponding to the predicted intent (which, in some instances, may be provided prior to receiving a user response). For example, decision application 144 may initiate a chat window with the user of device 110 and immediately provide information related to the resetting a password (the predicted intent) prior to the user providing a response or communication within the chat window.

In the example embodiment, decision application 144 may determine a user-initiated intent (step 212). In the example embodiment, decision application 144 may determine a user-initiated intent based on user input received from the user of device 110. In the example embodiment, decision application 144 may receive the user input indicating the user-initiated intent within the determined communication channel utilized to initiate communication with the user of device 110. For example, if the determined communication channel is a chat session, decision application 144 may detect a user input via a chat communication that may indicate a particular issue that the user is having (user-initiated intent). In other embodiments, the user input indicating the user-initiated intent may be received in a different communication channel than the determined communication channel.

In the example embodiment, decision application 144 determines if the user-initiated intent corresponds to the predicted user intent (decision 214). In the example embodiment, decision application 144 determines if the user-initiated intent matches or substantially matches the predicted user intent. For example, if the user-initiated intent is associated with issues with a password reset and predicted user intent is associated with issues with login, decision application 144 may determine that that the user-initiated intent substantially matches the predicted intent. In the example embodiment, if decision application 144 determines that the user-initiated intent corresponds to the predicted intent (decision 214, "YES" branch), decision application 144 may determine to continue communicating with the user regarding the particular issue associated with the user-initiated intent in the communication channel used to initiate communication with the user of device 110.

In the example embodiment, if decision application 144 determines that the user-initiated intent does not correspond to the predicted intent (decision 214, "NO" branch), decision application 144 may determine an appropriate communication channel based on the user-initiated intent (step 216). In the example embodiment, decision application 144 may refer to database 124 in order to determine one or more communication channels that correspond to the user-initiated intent. Furthermore, decision application 144 may determine an appropriate communication channel from the one or more communication channels in a similar manner as described above (in the discussion of step 208).

Furthermore, if the determined appropriate communication channel that corresponds to the user-initiated intent is different than the communication channel utilized to initiate communication with the user of device 110, decision application 144 may change the communication channel and re-engage with the user of device 110 using the communication channel that corresponds to the user-initiated intent (step 218). In addition, in one or more embodiments, if the determined appropriate communication channel that corresponds to the user-initiated intent is the same as the communication channel utilized to initiate communication with the user of device 110, decision application 144 may continue to engage with the user of device 110 using the communication channel utilized to initiate communication with the user of device 110, but may provide updated information that corresponds to the user-initiated intent to an agent (automated or human) associated with the communication channel.

Furthermore, in additional embodiments, decision application 144 may determine one or more appropriate channels for the predicted user intent utilizing one or more of the techniques described above, and then provide a hierarchy of the one or more appropriate channels to the user of device 110 to select. The user of device 110, may then provide input on what he/she feels is the most appropriate communication channel or may utilize a preferred communication channel to contact the service provider associated with application 142.

In one or more embodiments, decision application 144 may monitor activity on device 110 and determine a predicted intent, but the user of device 110 may decide to identify a communication channel and initiate communication with the service provider associated with application 142. If decision application 144 determines an appropriate communication channel that corresponds to the predicted user intent (in the manner described above) and if the communication channel utilized by the user of device 110 does not match the determined appropriate communication channel, decision application 144 may automatically change the communication channel to the determined appropriate communication channel that corresponds to the predict user transmit or may transmit a notification to the user of device 110 that includes a selectable element, that when selected may cause the user of device 110 to connect to the service provider via the determined appropriate communication channel (and may also end the current communication session initiated by the user of device 110). In one or more embodiments, the notification may also include information corresponding to the predicted user intent so the user of device 110 can verify if the predicted user intent is accurate prior to switching communication channels.

Figure 3:
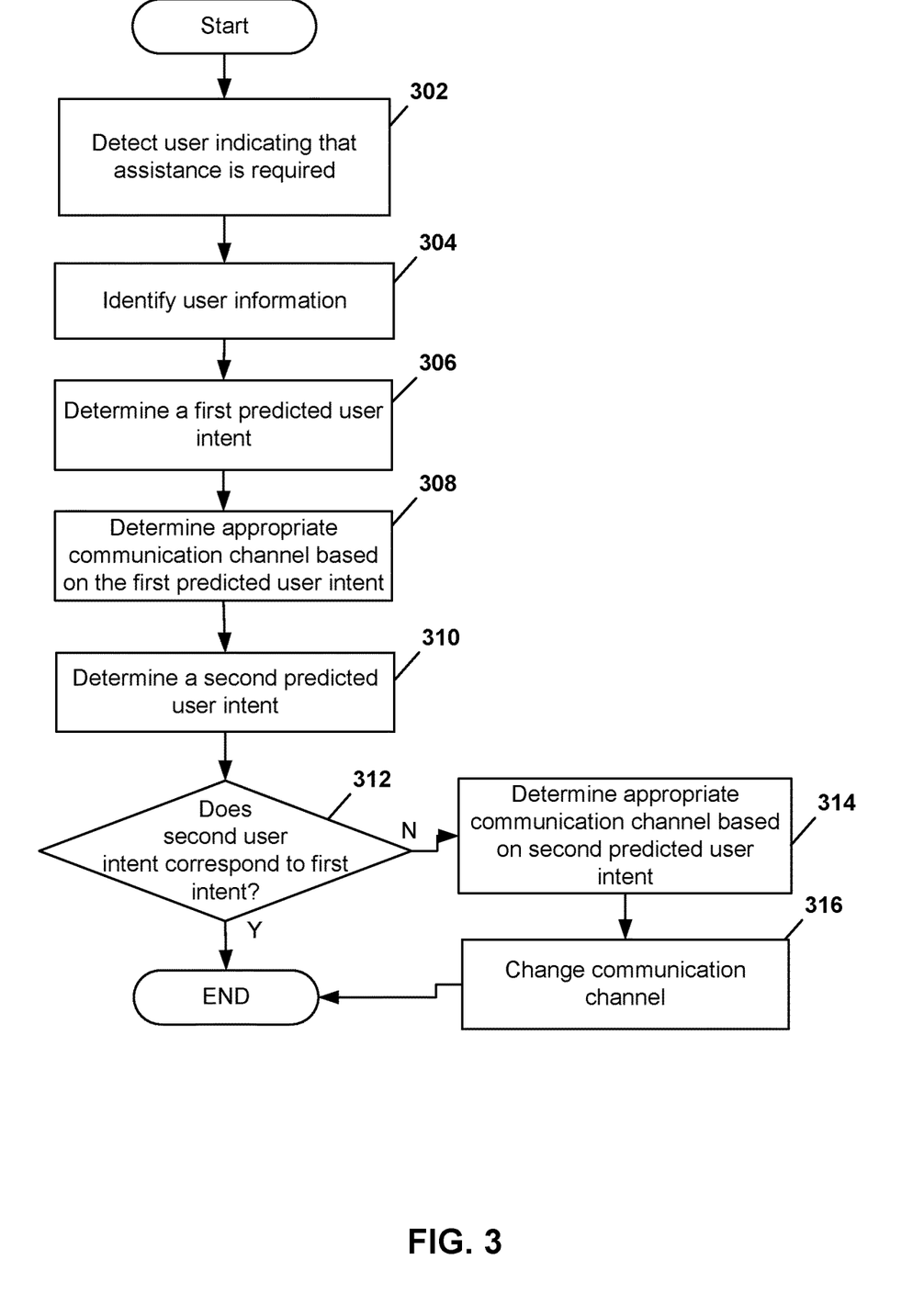
FIG. 3 is a flowchart illustrating the operations of the decision application of FIG. 1 in determining an appropriate communication channels for a first predicted user intent and then determining switch to another communication channel based on determining a second predicted user intent, in accordance with an embodiment.

FIG. 3 is a flowchart illustrating the operations of the decision application 144 in determining an appropriate communication channels for a first predicted user intent and then determining to switch to another communication channel based on determining a second predicted user intent, in accordance with an embodiment.

In additional embodiments, upon initiation of communication with the user of user device via an appropriate communication channel determined based on the predicted user intent, decision application 144 may continue to monitor user activity on device 110 and utilize the techniques discussed to update the predicted user intent based on the continued monitored activity.

Referring to FIG. 3, in the example embodiment, decision application 144 may detect that the user of device 110 requires assistance based on monitory user activity, as described above (step 302). Decision application 144 may then identify user information (step 304), and further determine a first predicted user intent (step 306) and determine an appropriate communication channel based on the first predicted user intent, as described above (step 308). In the example embodiment, decision application 144 may then determine a second predicted user intent based on continued monitored activity (step 310), and further determine if the second predicted user intent corresponds to the first predicted user intent (decision 312). If decision application 144 determines that the second predicted user intent corresponds to the first predicted user intent (decision 312, "YES" branch), decision application 144 may continue to engage with the user of device 110 via the determined communication channel corresponding to the first predicted user intent. If decision application 144 determines that the second predicted user intent does not correspond to the first predicted user intent (decision 312, "NO" branch), decision application 144 may determine a communication channel that corresponds to the second predicted user intent (in the same manner as the initial communication channel is determined) (step 314), and further may change the communication channel, based on determining that the communication channel that corresponds to the second predicted user intent is different than the communication channel that corresponds to the first predicted user intent (step 316).

For example, if based on the continued monitored activity, decision application 144 determines that the predicted user intent has changed from the initial predicted user intent, decision application 144 may then determine if the newly determined predicted user intent corresponds to a different communication channel than the communication channel currently being utilized to communicate with the user. Based on determining that the newly determined predicted user intent corresponds to a different communication channel (a second channel), decision application 144 may stop communication via the original channel and re-engage with the user via the second channel. In one or more embodiments, decision application 144 may continue with the steps of determining a user-initiated intent and determining if the communication channel needs to be changed based on the user-initiated intent as described above (steps 212 to 218).

Furthermore, in one or more embodiments, while FIG. 1 the service provider is depicted as maintaining and supporting application 142 (and all corresponding client applications), in other embodiments, the service provider may maintain a website that the user of device 110 may access. Therefore, the monitored activity discussed with regard to step 202 may correspond to the activity of the user of device 110 on one or more webpages of the website of the service provider. Furthermore, the user information of the user of device 110 may correspond to the use of the website, and communication channels initiated or provided to the user of device 110 may be facilitated via the website, such as chat session that occurs via the website of the service provider.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 4:
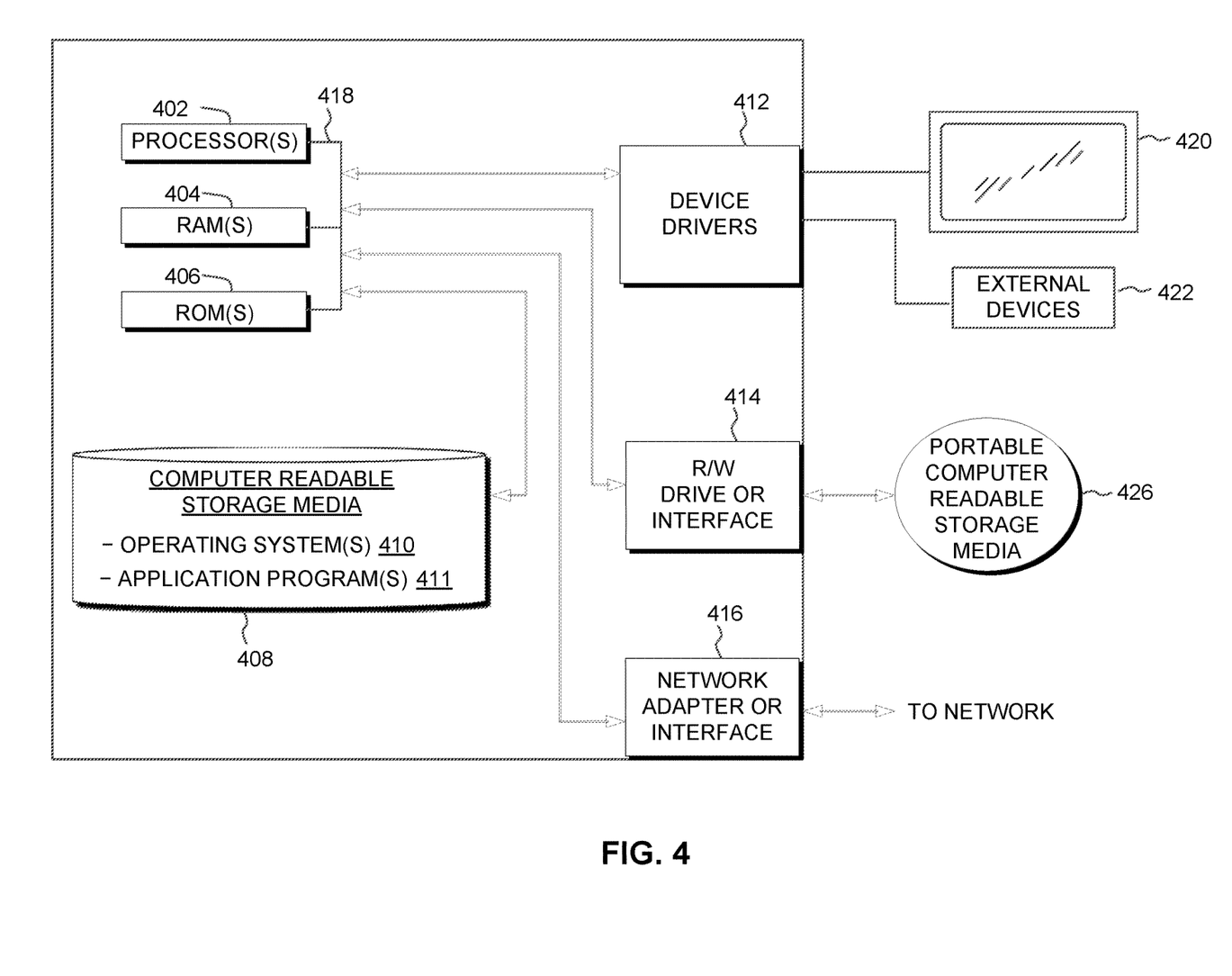
FIG. 4 is a block diagram depicting the hardware components of the intelligent service system of FIG. 1, in accordance with an embodiment.

FIG. 4 depicts a block diagram of components of computing devices contained in intelligent service system 100 of FIG. 1, in accordance with an embodiment. It should be appreciated that FIG. 4 provides only an illustration of one implementation and does not imply any limitations with regard to the environments in which different embodiments may be implemented. Many modifications to the depicted environment may be made.

Computing devices may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, decision application 144, are stored on one or more of the computer readable storage media 408 for execution by one or more of the processors 402 and by utilizing one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 414 to read from and write to one or more portable computer readable storage media 426. Application programs 411 on the computing devices may be stored on one or more of the portable computer readable storage media 426, read via the respective R/W drive or interface 414 and loaded into the respective computer readable storage media 408.

Computing devices may also include a network adapter or interface 416, such as a TCP/IP adapter card or wireless communication adapter (such as a 4G wireless communication adapter using OFDMA technology). Application programs 411 on the computing devices may be downloaded to the computing devices from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Computing devices may also include a display screen 420, and external devices 422, which may include, for example a keyboard, a computer mouse and/or touchpad. Device drivers 412 interface to display screen 820 for imaging, to external devices 422, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
   one or more computer-readable memories storing program instructions; and
   one or more processors configured to execute the program instructions to cause the computer system to perform operations comprising:
      monitoring activity associated with a user of a service provider, the activity comprising: a user access of a document on a user device, an amount of time spent by the user viewing a specified content displayed on the user device, a number of failed user login attempts, or a failed user transaction;
      detecting, based on the monitoring, that the user requires assistance;
      in response to the detecting that the user requires assistance, determining a predicted user intent associated with the user based on the monitoring;
      determining that a first communication channel corresponds to the determined predicted user intent;
      causing a communication to be initiated with the user utilizing the first communication channel;
      detecting a user input through the first communication channel;
      analyzing the detected user input;
      determining, based on the analyzing, a user-initiated intent, wherein the determining the user-initiated intent is performed separately from the determining the predicted user intent;
      in response to determining the user-initiated intent, determining if the user-initiated intent corresponds to the predicted user intent;
      in response to determining that the user-initiated intent does not correspond to the predicted user intent, determining that a second communication channel corresponds to the user-initiated intent, the second communication channel being different from the first communication channel;
      in response to determining that the second communication channel corresponds to the user-initiated intent, transmitting a notification to the user device via the first communication channel, the notification including a selectable element, the notification further including information corresponding to the predicted user intent;
      detecting a user selection of the selectable element; and
      causing, in response to the detecting of the user selection of the selectable element, the communication with the user to be switched to the second communication channel and terminating the communication utilizing the first communication channel.

2. The computer system of claim 1, wherein the document comprises a frequently asked questions (FAQ) document.

3. The computer system of claim 1, wherein the determining that the first communication channel corresponds to the determined predicted user intent includes:
   accessing a database;
   determining, from the database, that a first plurality of communication channels are associated with the determined predicted user intent; and
   selecting the first communication channel from the first plurality of communication channels as corresponding to the determined predicted user intent based at least on a total weight score associated with the first communication channel.

4. The computer system of claim 3, wherein the first plurality of communication channels includes the first communication channel and the second communication channel, and wherein the total weight score associated with the first communication channel is higher than a total weight score associated with the second communication channel.

5. The computer system of claim 3, wherein the first plurality of communication channels includes the first communication channel and the second communication channel, and wherein the total weight score associated with the first communication channel is lower than a total weight score associated with the second communication channel, and wherein a cost associated with the second communication channel is higher than a cost associated with the first communication channel.

6. The computer system of claim 3, wherein the selecting the first communication channel from the first plurality of communication channel as corresponding to the determined predicted user intent is further based on an engagement score associated with the user.

7. The computer system of claim 1, wherein the determining that the second communication channel corresponds to the user-initiated intent comprises:
   presenting, to the user, a second plurality of communication channels as potential communication channels to replace the first communication channel;
   receiving, from the user, a selection of one of the communication channels from the second plurality of communication channels; and
   determining that the one of the communication channels selected by the user is the second communication channel.

8. A non-transitory computer-readable medium storing computer-executable instructions, that in response to execution by one or more hardware processors, causes the one or more hardware processors to perform operations comprising:
   monitoring activity associated with a user of a service provider, the activity comprising: a user access of a document on a user device, an amount of time spent by the user viewing a specified content displayed on the user device, a number of failed user login attempts, or a failed user transaction;
   predicting, based on the monitoring, that the user requires assistance;
   determining a predicted user intent associated with the user based on the monitoring;
   determining that a first communication channel corresponds to the determined predicted user intent;
   causing a communication to be initiated with the user utilizing the first communication channel;
   detecting a user input through the first communication channel;
   analyzing the detected user input;
   determining, based on the analyzing, a user-initiated intent, wherein the determining the user-initiated intent is performed separately from the determining the predicted user intent;
   in response to determining the user-initiated intent, determining if the user-initiated intent corresponds to the predicted user intent;
   in response to determining that the user-initiated intent does not correspond to the predicted user intent, determining that a second communication channel corresponds to the user-initiated intent, the second communication channel being different from the first communication channel and being determined at least in part based on feedback received from the user;
   in response to determining that the second communication channel corresponds to the user-initiated intent, transmitting a notification to the user device via the first communication channel, the notification including a selectable element, the notification further including information corresponding to the predicted user intent;
   detecting a user selection of the selectable element; and
   causing, in response to the detecting of the user selection of the selectable element, the communication with the user to be switched to the second communication channel and terminating the communication utilizing the first communication channel.

9. The non-transitory computer-readable medium of claim 8, wherein the document comprises a frequently asked questions (FAQ) document.

10. The non-transitory computer-readable medium of claim 8, wherein the determining that the first communication channel corresponds to the determined predicted user intent includes:
   accessing a database;
   determining, from the database, that a first plurality of communication channels are associated with the determined predicted user intent; and
   selecting the first communication channel from the first plurality of communication channels as corresponding to the determined predicted user intent based at least on a total weight score associated with the first communication channel, and a cost associated with the first communication channel.

11. The non-transitory computer-readable medium of claim 10, wherein the first plurality of communication channels includes the first communication channel and the second communication channel, and wherein the total weight score associated with the first communication channel is higher than a total weight score associated with the second communication channel.

12. The non-transitory computer-readable medium of claim 10, wherein the first plurality of communication channels includes the first communication channel and the second communication channel, and wherein the total weight score associated with the first communication channel is lower than a total weight score associated with the second communication channel, wherein the total weight score associated with the first communication channel is within a threshold percentage of the total weight score associated with the second communication channel, and wherein the cost associated with the second communication channel is higher than a cost associated with the first communication channel.

13. The non-transitory computer-readable medium of claim 10, wherein the selecting the first communication channel from the first plurality of communication channel as corresponding to the determined predicted user intent is further based on an engagement score associated with the user.

14. The non-transitory computer-readable medium of claim 8, wherein the first communication channel or the second communication channel comprises an email, a text message, a phone call, an IVR call, or a chat session.

15. A method, comprising:
   monitoring, by a computer system, activity associated with a user of a service provider, the activity comprising: a user access of a document on a user device, an amount of time spent by the user viewing a specified content displayed on the user device, a number of failed user login attempts, or a failed user transaction;
   determining, by the computer system based on the monitoring, that the user requires assistance;
   predicting, by the computer system, a predicted user intent associated with the user based on the monitoring;

determining, by the computer system, that a first communication channel corresponds to the predicted user intent;

causing, by the computer system, a communication to be initiated with the user utilizing the first communication channel;

detecting, by the computer system, a user input through the first communication channel;

analyzing, by the computer system, the detected user input;

predicting, by the computer system and based on the analyzing, a user-initiated intent, wherein the predicting the user-initiated intent is performed separately from the predicting the user intent;

in response to determining the user-initiated intent, determining, by the computer system, if the predicted user-initiated intent corresponds to the predicted user intent;

in response to determining that the user-initiated intent does not correspond to the predicted user intent, transmitting, by the computer system, a notification to the user device via the first communication channel, the notification including a selectable element, the notification further including information corresponding to the predicted user intent;

detecting, by the computer system, a user selection of the selectable element;

causing, by the computer system in response to the detecting of the user selection of the selectable element, a second communication channel that corresponds to the user-initiated intent to be utilized to communicate with the user, the second communication channel being different from the first communication channel; and terminating the communication utilizing the first communication channel.

16. The method of claim 15, wherein the document comprises a frequently asked questions (FAQ) document.

17. The method of claim 15, wherein the determining that the first communication channel corresponds to the determined predicted user intent includes:

accessing, by the computer system, a database;

determining, from the database, that a first plurality of communication channels are associated with the predicted user intent; and selecting, by the computer system, the first communication channel from the first plurality of communication channels as corresponding to the predicted user intent based at least on a total weight score associated with the first communication channel.

18. The method of claim 17, wherein the first plurality of communication channels includes the first communication channel and the second communication channel, and wherein the total weight score associated with the first communication channel is higher than a total weight score associated with the second communication channel.

19. The method of claim 17, wherein the first plurality of communication channels includes the first communication channel and the second communication channel, and wherein the total weight score associated with the first communication channel is lower than a total weight score associated with the second communication channel, and wherein a cost associated with the second communication channel is higher than a cost associated with the first communication channel.

20. The method of claim 15, wherein the first communication channel or the second communication channel comprises an email, a text message, a phone call, an IVR call, or a chat session.

* * * * *